United States Patent Office 2,931,772
Patented Apr. 5, 1960

2,931,772

METHOD FOR CONVERTING A DRILLING FLUID INTO A WELL PACKER FLUID

John S. Brukner, Houston, Tex., assignor to Texaco Inc., a corporation of Delaware No Drawing. Application December 6, 1957
Serial No. 700,972

15 Claims. (Cl. 252—8.55)

This invention relates to drilling fluids and to the drilling of wells through subsurface formations by means of well drilling tools. This invention particularly relates to a drilling operation, such as a rotary drilling operation, which involves the circulation of a drilling fluid down the well bore, about the drilling bit and back to the surface. In a rotary drilling operation a drilling fluid is pumped down the drill stem to the drilling bit at the bottom of the bore hole. The stream of drilling fluid then passes through the drilling bit and moves upwardly within the annular space between the drill stem and the well bore wall carrying with it the drilling cuttings.

After the drilling operation has been concluded, or during a halt in the drilling operation, sometimes a portion of the drilling fluid is left behind in the bore hole to serve as a packer fluid during subsequent testing of the petroleum producing formation and/or production of petroleum therefrom and/or the well completion operations.

Packer fluids, therefore, are sometimes subjected to fairly high temperatures, e.g., above about 250° F., for a substantial length of time, days and even months. It is desirable, therefore, that a well packer fluid be thermally stable and remain fluid or readily pumpable even after exposure to high temperatures for prolonged periods of time. Sometimes, however, due to prolonged exposure at a relatively high temperature within the well bore the packer fluids tend to become unpumpable and form plastic, almost rock-like materials. When this occurs casing and tubing and other equipment in contact with the packer fluid become in effect cemented therein. Moreover, when this occurs the packer fluid cannot readily be removed from the well bore. In this event it is necessary to mechanically remove or actually drill out the packer fluid, perhaps at the same time losing valuable equipment and increasing the cost of the well.

Drilling fluids which contain calcium hydroxide generally cannot be satisfactorily employed as packer fluids. Drilling fluids having a relatively high proportion of calcium hydroxide therein, such as an aqueous phase which is saturated with calcium hydroxide, when subjected to a relatively high temperature for prolonged periods of time under relatively static conditions tend to harden and form a cement-like material. Accordingly, it has been the practice heretofore, if possible, whenever a drilling fluid containing a substantial amount of lime or calcium hydroxide is employed in a well drilling operation, to avoid leaving any such drilling fluid in the well bore wherein it may be exposed for a substantial length of time to a relatively high temperature. Moreover, it has been the practice heretofore to avoid using a high lime drilling fluid as a packer fluid upon well completion.

Accordingly, it is an object of this invention to provide a method whereby a high lime drilling fluid or a drilling fluid characterized by the presence of a substantial amount of calcium hydroxide herein, such as in the aqueous phase thereof, might be satisfactorily treated so that it can be suitably employed as a packer fluid.

Another object of this invention is to provide a method for converting a calcium hydroxide-containing drilling fluid into a relatively temperature stable fluid which might be suitably employed as a packer fluid during well completion.

Still another object of this invention is to provide an improved well drilling operation.

Yet another object of this invention is to provide, in a well drilling operation, an improved method for converting a lime-containing drilling mud into a temperature stable packer fluid.

How these and other objects of this invention are accomplished will become apparent in the light of the accompanying disclosure. In accordance with this invention it has now been discovered that an aqueous calcium hydroxide-containing drilling fluid is convertible into a relatively temperature stable packer fluid by treating the calcium hydroxide-containing drilling fluid with a water soluble citrate and a chemical treating agent which by metathetical reaction with calcium hydroxide forms a substantially water insoluble hydroxide, i.e., the hydroxyl component of the calcium hydroxide in the drilling fluid is removed therefrom, e.g., precipitated as a water insoluble hydroxide. Preferably the same chemical treating agent by metathetical reaction also forms an insoluble calcium component with the calcium component of calcium hydroxide.

Various types of calcium hydroxide-containing fluids are suitably converted in accordance with the practice of this invention into a relatively temperature stable packer fluid. For example, a so-called low lime drilling fluid which is usually characterized as an aqueous drilling fluid containing an alkaline (pH about 12.0) aqueous phase which is saturated with calcium hydroxide and which contains a small amount, in the range about 0.125–1.0 lb. of sodium hydroxide therein thereby yielding a drilling fluid having a relatively low calcium ion concentration, below about 200–250 parts per million by weight (p.p.m.), is readily converted in accordance with the practice of this invention into a temperature stable packer fluid. Further, a so-called high pH lime mud such as an aqueous drilling mud having an aqueous phase which is saturated with calcium hydroxide and which contains dissolved therein a relatively large amount of sodium hydroxide, such as an amount of sodium hydroxide in the range 1–6 lbs. per barrel of drilling fluid, is suitably converted in accordance with the practice of this invention into a temperature stable packer fluid. A high pH lime mud generally has a pH substantially above 12.0, such as a pH in the range 12.6–13.5, depending upon the amount of sodium hydroxide added thereto. A high pH lime mud is further characterized by having an alkaline aqueous phase which contains a relatively low dissolved calcium or calcium ion concentration, e.g., a calcium ion concentration below about 200 p.p.m., usually below about 100 p.p.m.

The practice of this invention, however, is particularly applicable to converting a high calcium, relatively low pH lime drilling fluid which has an aqueous phase characterized by a relatively high dissolved calcium or calcium ion concentration, above about 200 p.p.m., preferably in the range 300–1500 p.p.m., into a temperature stable packer fluid. The aqueous phase of this type of calcium hydroxide-containing drilling fluid is characterized by a relatively low pH, not in excess of 12.6, the pH corresponding to a saturated aqueous solution of calcium hydroxide. A mud of this type might be designated as a low pH, high calcium lime mud and has been found to be very useful for drilling through heaving shale formations. This type of mud is more thoroughly described in U.S. 2,802,783, issued August 13, 1957, the disclosures of which patent are herein incorporated and made a part of this disclosure.

As indicated hereinabove in accordance with the practice of this invention a calcium hydroxide-containing aqueous drilling fluid is convertible into a temperature stable packer fluid by treating said drilling fluid with a water soluble citrate such as ammonium citrate or an alkali metal citrate such as sodium citrate, lithium citrate and potassium citrate, and with a chemical treating agent such as a water soluble metal salt, the hydroxide of the metal component of which salt is substantially water insoluble, and the anion component of which salt forms a water insoluble compound with the calcium component of calcium hydroxide, so that by metathetical reaction with calcium hydroxide the resulting water insoluble metal hydroxide and corresponding water insoluble calcium compound (anion) are formed, thereby removing substantially all of the calcium hydroxide from the aqueous phase of the drilling mud.

Any compound or chemical treating agent which by metathetical reaction with calcium hydroxide leads to the formation of a substantially water insoluble hydroxide and calcium-containing compound, thereby removing the calcium and hydroxyl components of the calcium hydroxide from the aqueous phase of the drilling fluid, may be satisfactorily employed in the practice of this invention.

Substantially water insoluble hydroxides include nickel hydroxide, chromium hydroxide, aluminum hydroxide, iron hydroxide, tin hydroxide, copper hydroxide, zinc hydroxide and others. Accordingly, the corresponding water soluble salts of these metals, such as the water soluble chloride, nitrate, sulfate, acetate, salts of these metals, preferably the fluoride salts thereof since $CaF_2$ is substantially water insoluble, might be satisfactorily employed as the chemical treating agents in accordance with this invention. As indicated hereinabove, preferably an amount of chemical treating agent is employed sufficient to chemically remove or precipitate substantially all of the calcium hydroxide (hydroxyl and calcium components together with any extraneous dissolved calcium) from the drilling fluid being treated into the corresponding water insoluble metal hydroxide. Usually only a minor amount, based on the total treated fluids of the above mentioned chemical treating agents or metal salts, the hydroxide of which is substantially water soluble, need be added to the drilling fluid undergoing treatment. It has been found that an amount of chemical treating agent in the range 0.25–20 lbs. per barrel, more or less depending upon the molecular or equivalent weight of the chemical treating agent, yields satisfactory results.

The water soluble citrate which is also present in the resulting treated drilling fluid and which serves to enhance the temperature stability of the resulting treated drilling fluid is also usually added thereto in a minor amount, such as an amount in the range 0.25–6.0 lbs per barrel of the resulting treated fluid. The water soluble citrate and chemical treating agent may be added separately, independently of each other, or together.

The following example is illustrative of the practice of this invention. Portions of an aqueous shale control drilling mud weighing 14.4 lbs. per gal. and characterized by a relatively low pH, pH below 12.6, and having an aqueous phase containing hydratable clayey material dispersed therein, which phase is saturated with calcium hydroxide and contains a calcium ion concentration above 200 parts per million by weight due to the dissolution thereon of a water soluble calcium salt such as calcium chloride, were treated by incorporating therein various chemical treating agents in accordance with the practice of this invention. The resulting treated portions of the shale control, high calcium, low pH lime drilling mud were then subjected to high temperature aging, temperature 335° F., for a period of 24 hours. After high temperature aging the appearance of the mud was then observed. The results of these tests are set forth in accompanying Table I.

*Table I*

| Type Mud+Additions | Properties Before Bombing | | | | | | Properties After Bombing @335° F. for 24 hours | |
|---|---|---|---|---|---|---|---|---|
| | Gel Strength | | pH | $P_m{}^1$ | $P_f{}^2$ | $M_f{}^3$ | Appearance | Shear (#/100 ft²) |
| | 0 min. | 10 min. | | | | | | |
| Shale Control Base Mud | 6 / 0 | 4.6 | 11.9 | 7.3 | 0.7 | 2.1 | Plastic | 2,993 |
| Shale Control Base Mud+4#/bbl. lithium citrate | 3 / 0 | 16 / 0 | 12.21 | 9.2 | 1.4 | 4.5 | ___do___ | 1,612 |
| Shale Control Base Mud+6#/bbl. lithium citrate | 5 / 0 | 13 / 0 | 12.3 | 9.4 | 1.8 | 6.5 | ___do___ | 3,200 |
| Shale Control Base Mud+4#/bbl. $CrF_3$ | 29 / 0 | 6.0 | 9.14 | 0.7 | 0.05 | 1.3 | ___do___ | 2,200 |
| Shale Control Base Mud+5#/bbl. $CrF_3$+¼#/bbl. chromium acetate | 3.3 | 7.5 | 8.12 | 0.1 | 0 | 1.6 | ___do___ | 2,400 |
| Shale Control Base Mud+9#/bbl. $AlF_3$ | 55 | 60+ | 7.8 | 0 | 0 | 1.3 | Borderline—Fluid | 450 |
| Shale Control Base Mud+9#/bbl. $NiF_2$ | 60+ | 60+ | 9.49 | 0.7 | 0.15 | 4.0 | Fluid—Very High Gels | 780 |
| Shale Control Base Mud+4#/bbl. $CrF_3$+4#/bbl. lithium citrate | 3 / 0 | 27 / 0 | 9.6 | 1.2 | 0.3 | 3.8 | Fluid—Medium Gels | 337 |
| Shale Control Base Mud+4#/bbl. $CrF_3$+6#/bbl. lithium citrate | 6 / 0 | 22 / 0 | 9.82 | 1.3 | 0.4 | 3.8 | Fluid—Very High Gels | 397 |
| Shale Control Base Mud+5#/bbl. $CrF_3$+4#/bbl. lithium citrate+¼#/bbl. chromium acetate | 5 / 0 | 17 / 0 | 8.6 | 0.5 | 0.1 | 2.8 | Fluid—Low to Medium Gels | 249 |
| Shale Control Base Mud+9#/bbl. $AlF_3$+6#/bbl. lithium citrate | 11.5 | 15.0 | 7.64 | 0 | 0 | 3.4 | Fluid—High Gels | 390 |
| Shale Control Base Mud+9#/bbl. $NiF_2$+4#/bbl. lithium citrate | 28 | 35 | 9.8 | 1.1 | 0.1 | 2.5 | Fluid—Very Low Gels | 385 |
| Shale Control Base Mud+9#/bbl. $NiF_2$+6#/bbl. lithium citrate | 5.5 | 13.0 | 9.9 | 1.3 | 0.3 | 4.5 | ___do___ | 291 |

[1] $P_m$ is defined as number of cc. of N/50 $H_2SO_4$ required to titrate 1 cc. of the whole mud to a phenolphthalein end point.
[2] $P_f$ is defined as number of cc. of N/50 $H_2SO_4$ required to titrate 1 cc. of aqueous phase (filtered) of drilling fluid to a phenolphthalein end point and is a measure of the soluble hydroxyl ion content.
[3] $M_f$ is defined as number of cc. of N/50 $H_2SO_4$ required to titrate 1 cc. of aqueous phase (filtrate) of drilling fluid to methyl orange end point and is a measure of the soluble hydroxyl and carbonate ion content.
$CrF_3$ added as $CrF_3 \cdot 4H_2O$.

As clearly indicated by the data set forth in Table I a calcium hydroxide-containing drilling fluid when treated in accordance with the practice of this invention with a chemical treating agent to remove substantially all of the calcium hydroxide therefrom and after a minor amount of lithium citrate has been incorporated in the drilling mud the resulting treated drilling mud exhibits improved high temperature stability with respect to fluidity, thereby rendering the resulting treated drilling fluid more suitable as a well packer fluid.

Further, illustrative of the practice of this invention, portions of a low lime mud, characterized by a relatively low pH and having an aqueous phase containing hydratable clayey material dispersed therein, said aqueous phase being saturated with calcium hydroxide and containing a calcium ion concentration above about 200 parts per million by weight, were treated by incorporating therein various chemicals in accordance with this invention. The resulting treated portions of the low lime mud were then subjected to high temperature aging for various periods of time. After high temperature aging the appearance of the treated mud was then observed. The results of these tests are set forth in accompanying Table II.

*Table II*

| Type Mud+Additions | Gels 0' | Gels 10' | pH | Water Loss. cc. (30' @ 100 p.s.i.) | $P_m$ | $P_t$ | $M_t$ | Appearance After Bombing 24 hrs. @ 350° F. | Shear (#/100 ft.²) |
|---|---|---|---|---|---|---|---|---|---|
| Low Lime Mud A | 40 / 0 | 9.0 | 11.92 | 5.4 | 4.2 | 0.7 | 2.2 | Plastic [1] | 3,500 |
| Low Lime Mud A+3#/bbl. CrF₃+3#/bbl. lithium citrate | 8 / 0 | 20 / 0 | 9.45 | 3.7 | 1.2 | 0.15 | 4.5 | Fluid—Very [1] Low Gels | 526 |
| Low Lime Mud A+3#/bbl. CrF₃+1½#/bbl. lithium citrate | 7 / 0 | 18 / 0 | 8.62 | 4.2 | 0.9 | 0.05 | 2.2 | do | 320 |
| Low Lime Mud B | 1.8 / 0 | 18 / 0 | 12.24 | | 7.8 | 1.4 | 2.4 | Borderline Fluid | 1,090 |
| Low Lime Mud B+4#/bbl. CrF₃ | 7 / 0 | 4.8 | 8.32 | | 0.7 | 0.05 | 0.8 | F—VVLG, V₆₀₀=81.5 | 896 |
| Low Lime Mud B+1#/bbl lithium citrate | 0.8 / 0 | 3 / 0 | 12.26 | | 7.9 | 1.8 | 3.3 | Plastic | 970 |
| Low Lime Mud B+4#/bbl. CrF₃+1#/bbl. lithium citrate | 1 / 0 | 6 / 0 | 8.56 | | 0.8 | 0.05 | 0.8 | F—VVLG, V₆₀₀=47.6 cps | 210 |
| Low Lime Mud C | 1 / 0 | 6 / 0 | 12.13 | | 6.8 | 1.2 | 2.2 | Plastic | 875 |
| Low Lime Mud C+4#/bbl. CrF₃ | 4.5 / 0 | 3.6 | 8.32 | | 0.7 | 0.05 | 1.0 | F—VVLG, V₆₀₀=68.0 | 738 |
| Low Lime Mud C+1#/bbl. sodium citrate | 0.8 / 0 | 1.8 / 0 | 12.21 | | 7.2 | 1.4 | 2.8 | F—HG | 765 |
| Low Lime Mud C+4#/bbl. CrF₃+1#/bbl. sodium citrate | 1 / 0 | 5 / 0 | 8.42 | | 0.9 | 0.05 | 1.0 | F—VVLG, V₆₀₀=50.4 | 185 |
| Low Lime Mud D | 1.8 / 0 | 12 / 0 | 11.95 | | 5.6 | 0.7 | 1.6 | Plastic | 1,243 |
| Low Lime Mud D+4#/bbl. CrF₃+1#/bbl. lithium citrate | 1 / 0 | 5 / 0 | 7.95 | | 0.3 | 0.0 | 1.2 | F—VVLG, V₆₀₀=40.4 cps | 80 |
| Low Lime Mud D+4#/bbl. CrF₃+1#/bbl. sodium citrate | 1 / 0 | 5 / 0 | 7.99 | | 0.4 | 0.0 | 1.2 | F—VVLG, V₆₀₀=40.0 cps | 80 |

[1] After bombing 67 hrs. @ 350° F.
F—VVLG. Fluid—very very low gels.
F—HG. Fluid—high gels.
Low Lime Mud A, wt. 17.3#/gal.
Low Lime Mud B, wt. 13.1#/gal., 23%vol. total solids, 12% vol. emulsified oil.
Low Lime Mud C, wt. 12.9#/gal., 23% vol. total solids, 11% vol. emulsified oil.
Low Lime Mud D, wt. 13.7#/gal., 26% vol. total solids, 10.5% vol. emulsified oil.

As clearly indicated by the data set forth in accompanying Table II, a low lime mud when treated in accordance with the practice of this invention has a substantially improved high temperature stability particularly with respect to fluidity, thereby rendering the resulting treated drilling mud more suitable as a well packer fluid.

In an actual field trial of the practice of this invention a low lime mud used in a drilling operation was centrifuged to reduce the clay solids thereof. Then chromium fluoride and sodium citrate were added to the mud. Experimental tests on the mud indicated that the shear value of the mud (before treatment) after aging for 24 hours at 350° F. was 6500 lbs. per 100 sq. ft. but that the same mud (after treatment in accordance with this invention) after aging for 24 hrs. at 350° F. had a shear value of 290 lbs. per 100 sq. ft.

As will be apparent to those skilled in the art in the light of the foregoing disclosure many modifications, substitutions and changes are possible without departing from the spirit or scope of this invention.

I claim:

1. In a drilling operation wherein an aqueous drilling mud which contains an aqueous phase saturated with respect to calcium hydroxide is employed during the drilling operation and wherein a portion of said aqueous drilling mud is left in the bore hole as a packer fluid, the improvement which comprises adding to said portion of said aqueous drilling mud a water soluble metal salt which metathetically reacts with the calcium hydroxide dissolved in said aqueous phase to form a substantially water insoluble metal hydroxide, said metal salt being added in an amount sufficient to precipitate substantially all of said calcium hydroxide in said portion of said drilling mud and adding to said portion of said aqueous drilling fluid a minor amount in the range 0.25–6.0 lbs. per bbl. of resulting treated drilling mud of a water soluble citrate.

2. A method of converting an aqueous drilling fluid which comprises an alkaline aqueous phase saturated with respect to calcium hydroxide into a temperature stable packer fluid which comprises adding to said drilling fluid a neutralizing agent for said calcium hydroxide which reacts with all of the hydroxyl portion of said calcium hydroxide in said drilling fluid to form a water insoluble hydroxide and incorporating in said drilling fluid a minor amount in the range 0.25–6.0 lbs. per bbl. of resulting treated drilling fluid of lithium citrate.

3. A method of converting an aqueous drilling fluid which comprises an alkaline aqueous phase having a pH in excess of about 12.6, said aqueous phase containing hydratable clayey material suspended therein and being saturated with respect to calcium hydroxide and containing a calcium ion concentration of less than about 200 parts per million by weight based on said aqueous phase into a temperature stable fluid which comprises adding to said drilling fluid a minor amount in the range 0.25–6.0 lbs. per bbl. of resulting treated drilling fluid of a water soluble citrate and a water soluble metal salt which by metathetical reaction with calcium hydroxide forms a substantially water insoluble metal hydroxide, said water soluble metal salt being added in an amount sufficient to precipitate substantially all of said calcium hydroxide in said drilling fluid.

4. A method in accordance with claim 3 wherein said metal salt is selected from a group consisting of the water soluble salts of chromium, nickel, iron, zinc and aluminum.

5. A method in accordance with claim 3 wherein said metal salt is a zinc salt.

6. A method in accordance with claim 4 wherein said water soluble metal salt is aluminum fluoride.

7. A method in accordance with claim 4 wherein said water soluble metal salt is chromium fluoride.

8. A method in accordance with claim 4 wherein said water soluble metal salt is nickel fluoride.

9. A method of converting an aqueous drilling fluid which contains an alkaline aqueous phase having a pH not in excess of 12.6, said aqueous phase containing hydratable clayey material dispersed therein and having a calcium ion concentration in excess of 200 parts per million by weight based on said solution, said aqueous phase being saturated with calcium hydroxide which comprises incorporating in said drilling fluid a minor amount in the range 0.25–6.0 lbs. per bbl. of resulting treated drilling fluid of lithium citrate and an amount of a water soluble metal salt which by metathetical reaction with the calcium hydroxide dissolved in said aqueous phase forms a relatively water insoluble metal hydroxide so as to remove substantially all of the dissolved calcium hydroxide from said aqueous phase as said water insoluble metal hydroxide.

10. A method in accordance with claim 9 wherein the calcium ion concentration in said aqueous phase is obtained by adding to said aqueous phase a water soluble calcium salt.

11. A method in accordance with claim 10 wherein said water soluble metal salt is selected from the group consisting of calcium chloride, calcium sulfate, calcium acetate, calcium formate and calcium nitrate.

12. In a drilling operation wherein a calcium hydroxide-containing drilling fluid is circulated down the bore hole, about the drilling bit and returned to the surface during the drilling operation and wherein a portion of the drilling fluid remains behind in the well bore at completion of the drilling operation, the improvement which comprises treating that portion of the drilling fluid remaining behind in the bore hole by adding thereto a chemical treating agent which by metathetical reaction with the calcium hydroxide in said drilling fluid precipitates the hydroxyl component thereof as an insoluble hydroxide, said treating agent being added in an amount sufficient to remove substantially all of said calcium hydroxide from said portion of said drilling fluid, and adding to said drilling fluid a minor amount in the range of 0.25–6.0 lbs. per bbl. of resulting treated drilling fluid of a water soluble citrate.

13. A method in accordance with claim 12 wherein said chemical treating agent is a water soluble salt of a metal, the metal hydroxide of which is substantially insoluble in water.

14. A method in accordance with claim 12 wherein said chemical treating agent is a water soluble salt selected from the group consisting of the water soluble salts of chromium, aluminum, nickel, iron and zinc.

15. A method in accordance with claim 12 wherein said water soluble citrate is sodium citrate.

References Cited in the file of this patent

UNITED STATES PATENTS

| | | |
|---|---|---|
| 2,343,113 | Jones | Feb. 29, 1944 |
| 2,391,622 | Dunn | Dec. 25, 1945 |
| 2,571,093 | Temple | Oct. 16, 1951 |
| 2,605,221 | Hoeppel | July 29, 1952 |
| 2,793,996 | Lummus | May 28, 1957 |
| 2,802,783 | Weiss et al. | Aug. 13, 1957 |
| 2,836,556 | Thompson et al. | May 27, 1958 |

OTHER REFERENCES

The Treatment of Mud Fluids Used in Drilling Operations, article in "Petroleum" Zeitschrift, issue No. 44, Nov. 2, 1932, pp. 7 and 8.

UNITED STATES PATENT OFFICE
CERTIFICATE OF CORRECTION

Patent No. 2,931,772                                     April 5, 1960

John S. Brukner

It is hereby certified that error appears in the printed specification of the above numbered patent requiring correction and that the said Letters Patent should read as corrected below.

Column 1, line 69, for "line" read -- lime --; columns 3 and 4, Table 1, third column thereof, under the heading "Gel Strength" and subheading "10 min.", last line, for "13 0" read -- 13.0 --.

Signed and sealed this 20th day of September 1960.

(SEAL)
Attest:

KARL H. AXLINE                                          ROBERT C. WATSON
Attesting Officer                                       Commissioner of Patents